US009393862B2

(12) United States Patent
Vulkan et al.

(10) Patent No.: US 9,393,862 B2
(45) Date of Patent: Jul. 19, 2016

(54) FUEL VALVE

(75) Inventors: Omer Vulkan, D. N. Hanegev (IL);
Vladimir Olshanetsky, Beer Sheva (IL);
Alon Rahamim, Beer Sheva (IL)

(73) Assignee: RAVAL A.C.S. LTD., Beer-Sheva (IL)

( * ) Notice: Subject to any disclaimer, the term of this patent is extended or adjusted under 35 U.S.C. 154(b) by 194 days.

(21) Appl. No.: 13/981,968

(22) PCT Filed: Jan. 31, 2012

(86) PCT No.: PCT/IL2012/050032
§ 371 (c)(1),
(2), (4) Date: Oct. 14, 2013

(87) PCT Pub. No.: WO2012/104850
PCT Pub. Date: Aug. 9, 2012

(65) Prior Publication Data
US 2014/0026976 A1    Jan. 30, 2014

Related U.S. Application Data

(60) Provisional application No. 61/437,816, filed on Jan. 31, 2011.

(51) Int. Cl.
*B60K 15/035* (2006.01)
*F16K 24/04* (2006.01)
*F16K 17/36* (2006.01)

(52) U.S. Cl.
CPC ........... *B60K 15/03519* (2013.01); *F16K 17/36* (2013.01); *F16K 24/044* (2013.01); *Y10T 137/0874* (2015.04); *Y10T 137/3099* (2015.04)

(58) Field of Classification Search
CPC ............ B60K 15/03519; F16K 24/044; Y10T 137/0874; Y10T 137/3099
USPC ..................... 137/202, 43, 432, 433
See application file for complete search history.

(56) References Cited

U.S. PATENT DOCUMENTS

| 5,313,978 A | 5/1994 | Takaki et al. |
| 5,738,132 A | 4/1998 | Zakai et al. |
| 5,944,044 A | 8/1999 | King et al. |
| 6,405,747 B1 | 6/2002 | King et al. |
| 6,557,578 B2 * | 5/2003 | Shimamura et al. .......... 137/202 |
| 6,701,952 B1 | 3/2004 | Ehrman et al. |

(Continued)

FOREIGN PATENT DOCUMENTS

| EP | 0 724 098 A1 | 7/1996 |
| EP | 0 773 128 A2 | 5/1997 |

(Continued)

OTHER PUBLICATIONS

International Search Report for PCT/IL2012/050032, two pages, mailed May 2, 2012.

*Primary Examiner* — R. K. Arundale
(74) *Attorney, Agent, or Firm* — Vorys, Sater, Seymour & Pease LLP

(57) ABSTRACT

Provided is a roll-over fuel valve configured with a float-sealable fluid path module including a float member axially displaceable within a float housing, between an open position and a closed position. The float member is normally biased in direction of the closed position and the float member includes an open liquid chamber for collecting liquid, thus taking part in the force equilibrium acting on the float member.

15 Claims, 6 Drawing Sheets

(56) References Cited

U.S. PATENT DOCUMENTS

| | | | |
|---|---|---|---|
| 7,188,613 B2* | 3/2007 | Miura et al. | 123/516 |
| 7,207,347 B2 | 4/2007 | Olshanetsky et al. | |
| 7,543,597 B2* | 6/2009 | Leonhardt | 137/202 |
| 2001/0011538 A1 | 8/2001 | Crary et al. | |
| 2003/0230288 A1 | 12/2003 | King et al. | |
| 2006/0037642 A1 | 2/2006 | Olshanetsky et al. | |
| 2007/0102043 A1* | 5/2007 | Ehrman et al. | 137/202 |
| 2009/0071543 A1 | 3/2009 | Vulkan et al. | |
| 2009/0194170 A1* | 8/2009 | Martin et al. | 137/197 |

FOREIGN PATENT DOCUMENTS

| | | |
|---|---|---|
| EP | 2 196 347 A1 | 6/2010 |
| JP | 62-88628 U | 6/1987 |
| JP | 8-254278 A | 10/1996 |
| JP | 2009-83766 A | 4/2009 |

* cited by examiner

FUEL VALVE

FIELD OF THE DISCLOSED SUBJECT MATTER

This disclosed subject matter relates to fuel valves and more particularly to a roll-over valve (ROV). Even more specifically the disclosed subject matter is concerned with a float configuration for such valves.

BACKGROUND OF THE DISCLOSED SUBJECT MATTER

A large variety of valves for use with vehicles' fuel tanks are known, among which are of more relevance with respect to the present invention those fitted with two or more valve assemblies, or those referred to as two stage valves.

A basic roll-over type fuel valve is disclosed in U.S. Pat. No. 5,738,132 disclosing a roll over vent valve comprising: a housing having a fluid inlet and a fluid outlet, the latter comprising a substantially elongated slit-like outlet aperture of the housing bounded by a valve seating. There is furthermore provided a float member located in the housing and axially displaceable within the housing between the inlet and the outlet; an elongated flexible closure membrane strip anchored at one end thereof to an end of the float member adjacent the outlet and at a portion thereof offset with respect to the outlet; spring biasing means located within the housing and bearing on the float member so as to spring bias it in the direction of the outlet; whereby the spring biasing together with buoyancy forces acting on the float member tend to press the membrane strip into sealing engagement with the outlet aperture whilst gravity forces acting on the float member tend to displace the float member away from the outlet so as to progressively detach the strip from sealing engagement with the outlet.

For example, U.S. Pat. No. 7,207,347 t discloses an over filling interdiction, vapor venting and roll over multi-function valve comprising a housing defining a confined space formed with one or more fluid inlets to said confined space, a fluid outlet chamber at top end of said housing and being in flow communication with an outlet duct; a first outlet port extending between said confined space and said fluid outlet chamber, and a second outlet port extending between said confined space and said fluid outlet chamber; a valve assembly located within the confined space and comprising a first stage float member associated with said first outlet port, and a second stage float member associated with said second outlet port, said float members being axially displaceable by buoyancy forces within the confined space about parallel axes, from an open position in which said first and second outlet port is open to a closed position; in which said first and said second outlet port is respectively sealingly engaged by said first stage float member and by said second stage float member wherein said first stage float member at least partially overlaps over said second stage float member such that when said first stage float member is in its open position it is supported by the second stage float member, the arrangement being such that only displacement of the second stage float member from the open position into closed position the first stage float member can be displaced into its closed position and sealingly engage the first outlet port.

Yet another example of a multi sage float type-valve is disclosed in U.S. Pat. No. 6,701,952 directed to a valve fitted within a fluid tank, the valve comprising a housing fitted with one or more fluid inlet ports, and an outlet port, said housing accommodating a float-type valve member axially aligned within the housing, and is displaceable therealong between an open position in which the outlet port is open, and a closed position in which the outlet port is sealingly closed; the valve characterized in that the housing is integrally formed with a nozzle member, said nozzle member being in flow communication with the outlet port and having a main portion with an outlet thereof extending within the tank; said outlet port being formed in an upper portion of the housing, said upper portion having an upper end wall and said outlet port being defined by an aperture within the upper end wall said aperture being sloped with respect to the longitudinal axis of the valve, a top wall portion of the float-type valve member facing said aperture and being equally sloped with respect to the longitudinal axis of the valve, said top wall portion of the valve member being provided with a closure membrane strip that is capable to sealingly engage the aperture within the upper end wall and to fully close the valve when the top wall portion of the float-type valve member approaches said outlet port

SUMMARY OF THE DISCLOSED SUBJECT MATTER

It is an object of the present disclosed subject matter to provide a roll-over fuel valve configured with a float-sealable fluid path module comprising a float member axially displaceable within a float housing, between an open position and a closed position; said float member being normally biased in direction of the closed position; and said float member comprises an open liquid chamber for collecting liquid, thus taking part in the force equilibrium acting on the float member.

According to an example of the disclosed subject matter the valve comprises a multi-stage float-sealable fluid path module and according to a particular design the valve is a two-stage module configuration, comprising two in-line float-sealable fluid path modules, each module configured with an independent float member axially displaceable within a respective float housing, between an open position and a closed position; said float member being normally biased in direction of the closed position; and said float member comprises an open liquid chamber for collecting liquid, thus taking part in the force equilibrium acting on the float member.

Any one or more of the following features and designs can be incorporated in a fuel valve according to the present disclosed subject matter, independently or in combination, wherein modifications apply to a single or multiple stage valve:

- Where the valve is a two-stage float configuration the float members extend in series, above one another, wherein fluid flow from a one float-sealable fluid path module flows into a second float-sealable fluid path module extending there above;
- a two-stage float configuration the float member of each module are displaceable independently from one another and however are displaceable between at least a fully open position, i.e. where both modules are at their respective open position (facilitating airing a fuel tank and draining an associated liquid fuel trap), and a closed position wherein at least one, and optionally both modules are at their respective closed position, i.e. preventing fluid flow towards the liquid fuel trap;
- Where the valve is a two-stage float configuration the float members are displaceable within an integrated housing;
- The liquid chamber of the float member has a top opening;
- The float housing has a bottom inlet opening being in flow communication with the fuel tank, and a top outlet opening being in flow communication with a liquid fuel trap;

The liquid chamber of the float member is configured to retain at least an amount of liquid also at considerable inclinations;

The float member is displaceable within the float housing only in the axial direction (i.e. rotation of which is prevented);

The float member has a diameter greater than its height;

The float member is restricted for axial displacement within the housing, thus eliminating clamping at the event of tilt thereof;

The liquid chamber of the float member is compartmented; according to one configuration the compartments are in fluid flow communication with one another. According to another configuration the compartments are not fluid flow communication with one another;

According to one particular design the liquid chamber has an annular cross-section, or annular segmented; the annular or annular segmented liquid chamber can be symmetric or of an irregular cross-section;

The float member is configured with an inclined top surface bearing a sealing member configured for sealing engagement against an outlet port of the float-sealable fluid path module; said outlet port being inclined in correspondence with the inclined top surface of the float member;

A top edge of the liquid chamber extends below a lower edge of the sealing member of the float member;

At a two-stage float configuration the outlet port of one float-sealable fluid path module extends into an inlet port of a consecutive, top float-sealable fluid path module;

The housing of the float-sealable fluid path module is configured for snap-fitting within the valve housing.

BRIEF DESCRIPTION OF THE DRAWINGS

In order to understand the disclosed subject matter and to see how it can be carried out in practice, embodiments will now be described, by way of non-limiting examples only, with reference to the accompanying drawings, in which.

DETAILED DESCRIPTION OF EMBODIMENTS

Figure 1A:
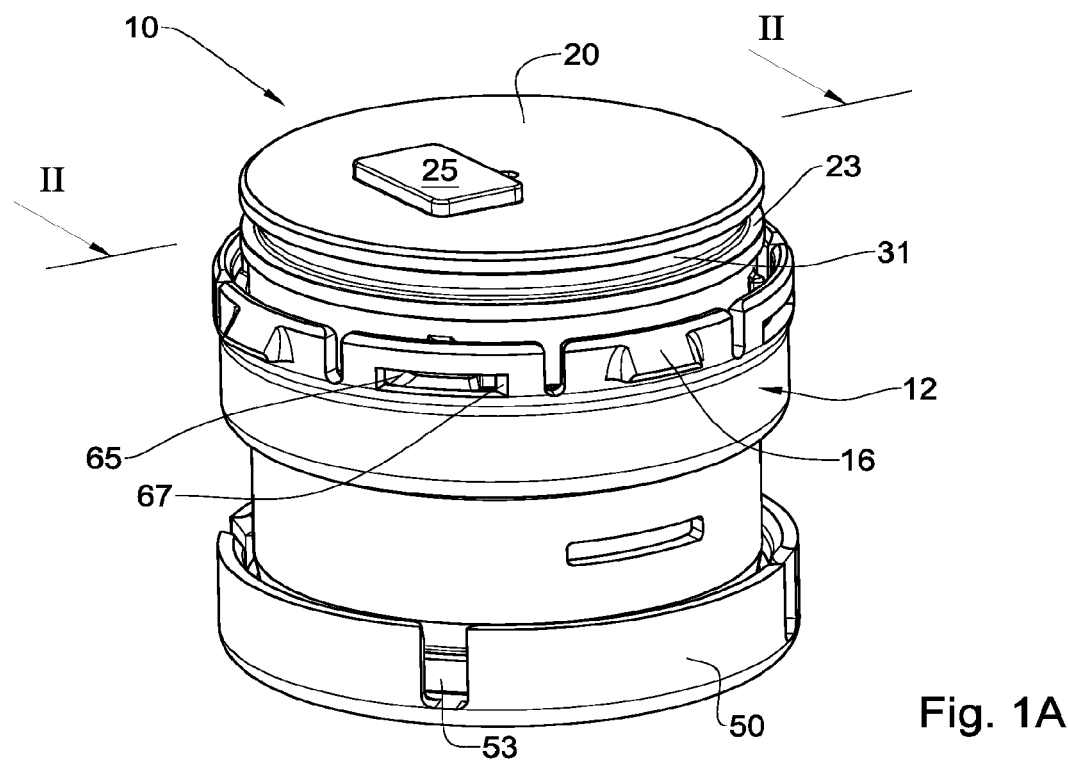
FIG. 1A is a perspective view of a high performance leak prevention roll-over valve.
Figure 2:
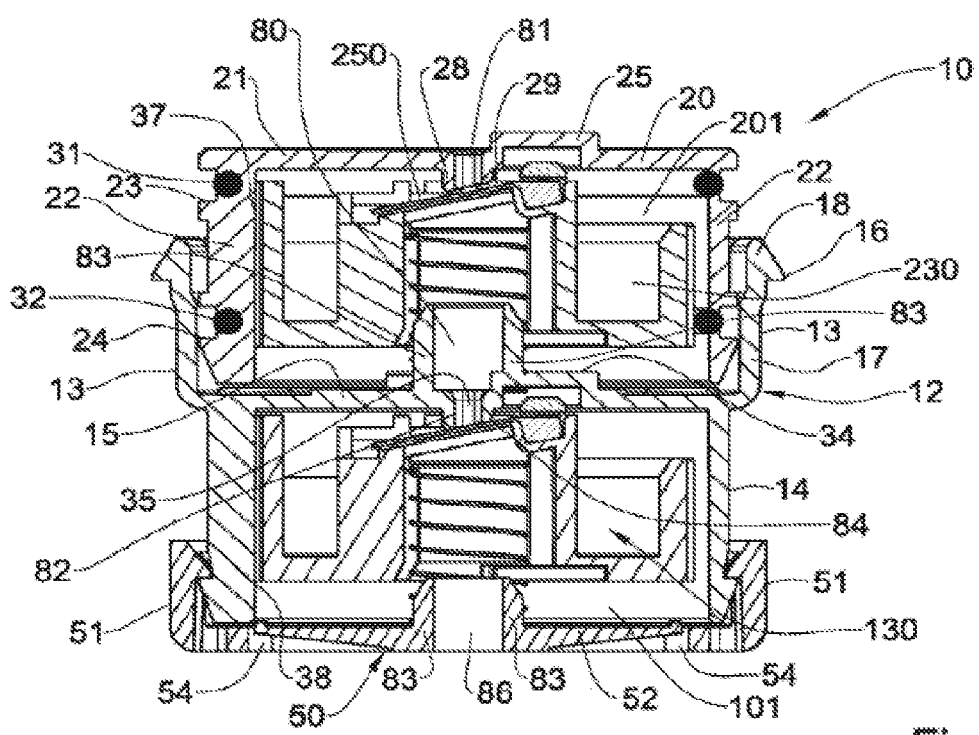
FIG. 2 is a longitudinal sectional view of the valve of FIG. 1, sectioned along II-II and shown in a fully closed position.
Figure 1B:
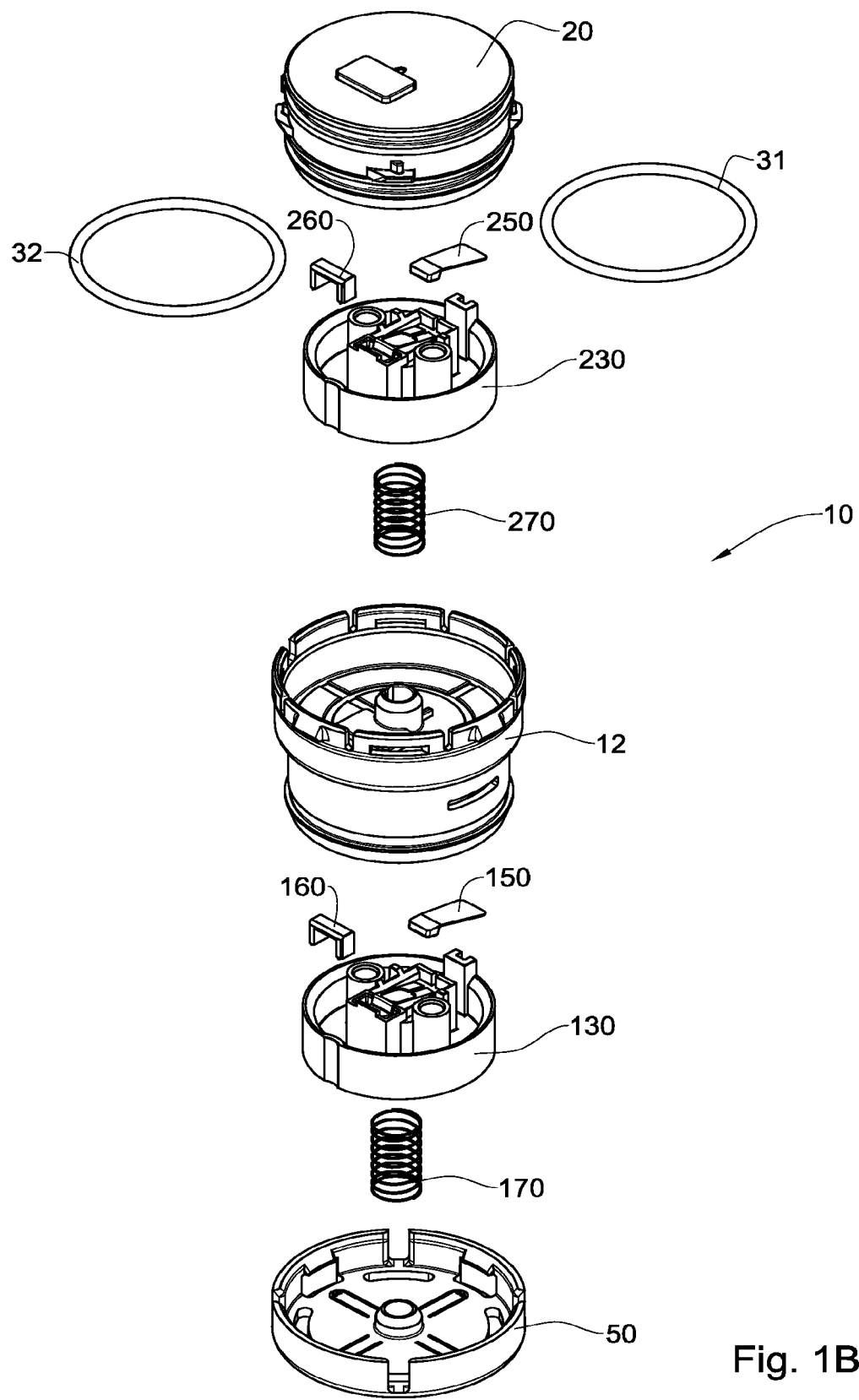
FIG. 1B is an isometric exploded view of the valve of FIG. 1A.
Figure 3:
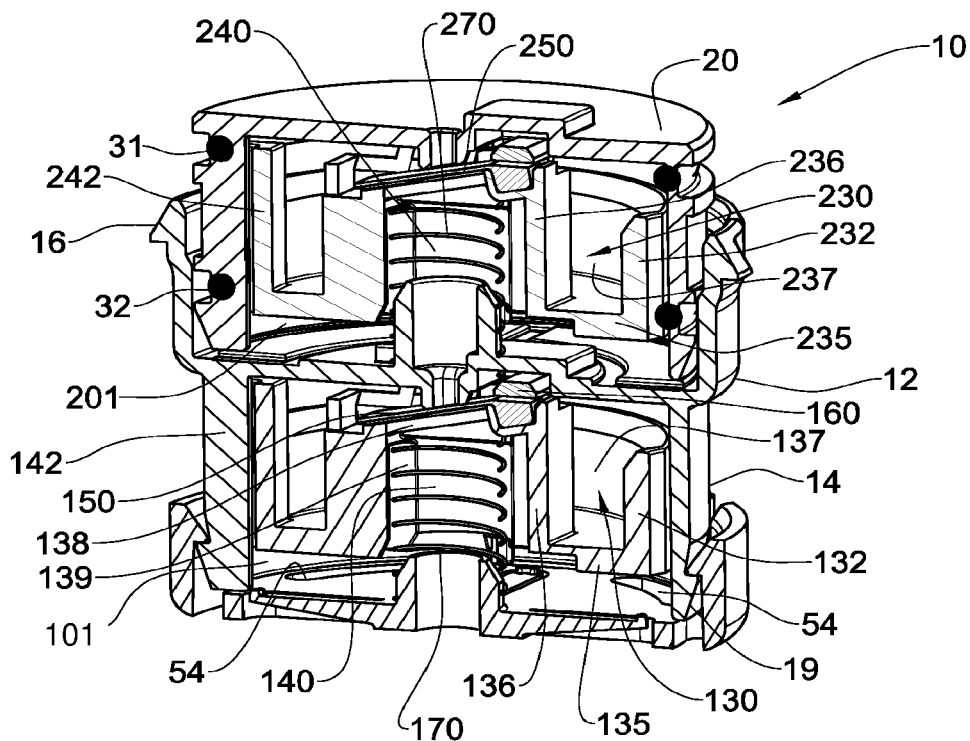
FIG. 3 is a perspective view of the section seen in FIG. 2.

Attention is first directed to FIGS. 1 to 3 illustrating a high performance leak prevention two-stage float-sealable fluid path module generally designated 10 of a roll-over valve (not shown in the drawings), configured for assembly within a fuel tank (not shown in the drawings) and further for coupling to a canister (fuel liquid/vapor treating device).

The float-sealable fluid path module 10 comprises a central housing 12, an upper housing 20, and a bottom cover 50. The central housing 12 comprises a central portion 15, upper portion 13, which is substantially cylindrical and projects up from the central partition portion 15, and lower portion 14, which is also cylindrical and projects down from the central partition portion 15.

Upper portion 13 has a larger inner diameter than that of lower portion 14, and comprises a lower wall portion 17, an upper wall portion 18 that has a slightly larger diameter than that of the lower wall 17, and lateral projections 16 projecting out from upper wall portion 18 for snapping engagement within corresponding openings of an above attachment e.g. within the fuel valve housing or directly within an opening configured in the fuel tank (not shown).

The lower portion 14 comprises a rib element 38 extending longitudinally along its inner surface and openings 19 for engagement with the bottom cover 50 as will hereinafter be described. The central partition portion 15 is disc shaped and comprises an orifice 35 positioned at its center, a spring support 83 projecting upward from the center of the central partition portion 15 and with a central space flow path 80 leading to the orifice 35, and downward projecting walls 82 of a cylindrical shape and formed with an inclined bottom seating surface 84. The central partition portion 15 further comprises a projection 34 upwardly projecting and of substantially rectangular shape.

The upper housing 20 is substantially cylindrical and comprises a top wall 21 and side wall 22 projecting downward from top wall 21. Top wall 21 comprises a projection 25 identical in shape to that of projection 34 described above, an orifice 81 and downward projecting walls 28 formed with a inclined bottom sealing surface 29, which are identical in shape to that of orifice 35, projecting walls 82 and surface 84 described above. Side wall 22 comprises an upper annular groove 23 and a lower annular groove 24, each configured for receiving O-ring 31 and O-ring 32 respectively. Additionally, side wall 22 has an identical inner diameter to that of lower portion 14 of the central housing 12, and further comprises a rib element 37 longitudinally extending along its inner surface and identical to that of notch element 38 described above. The upper housing 20 is snappingly engaged by several openings 65 (FIG. 1) formed in central housing 12 engageable by corresponding lateral projections 67 formed on the outer surface of side wall 22. The upper housing 20 resides sealingly within the upper portion 13 of central housing 12, being sealed by O-ring 32 pressing against the inner surface of lower wall 17 and forming therein an upper chamber 201.

The bottom cover 50 is substantially cylindrical and comprises a bottom lateral wall 52 and a side wall 51 projecting upward from the lateral wall 52 and grooves 53 within the side wall 51. Lateral wall 52 comprises apertures 54, central port 86, and a spring support 83. The bottom cover 50 has a slightly larger diameter that that of the lower portion 14 of central housing 12, the lower portion 14 resides within bottom cover 50 forming a lower chamber 101. Apertures 54 facilitate fluid flow between the lower float module 205 and a fuel tank (not shown) of a vehicle in which the valve resides.

Residing within the lower chamber 101 of the lower module of the float-sealable fluid path module 10, there is a float member 130 substantially cylindrically shaped, an elongated strip-like flexible membrane 150, secured at one end by a membrane holder 160, and a coiled spring 170. The float member 130 is axially displaceable and being spring biased in an upward direction by means of a coiled lower spring 170 and comprises a disc shaped base 135, vertically projecting wall 132 projecting up from base 135 and forming a annular cup-like structure collecting chamber 137.

Lower chamber 101 further comprises a Lower spring housing chamber 140, spring bearing surface 139, and inclined upper wall 138, whose inclination with respect to the longitudinal axis of the roll-over valve 10 and respectively of the float member 130 corresponds to the inclination of the bottom seating surface 84 or the central housing 12.

As can be seen in the figures, each of the float members has a diameter greater than its height. This feature provides increased flotation of the float member, resulting in essentially improved sealing force, i.e. the force vector in direction urging each of the floats into its upwards, sealed position, is increased.

Figure 6:
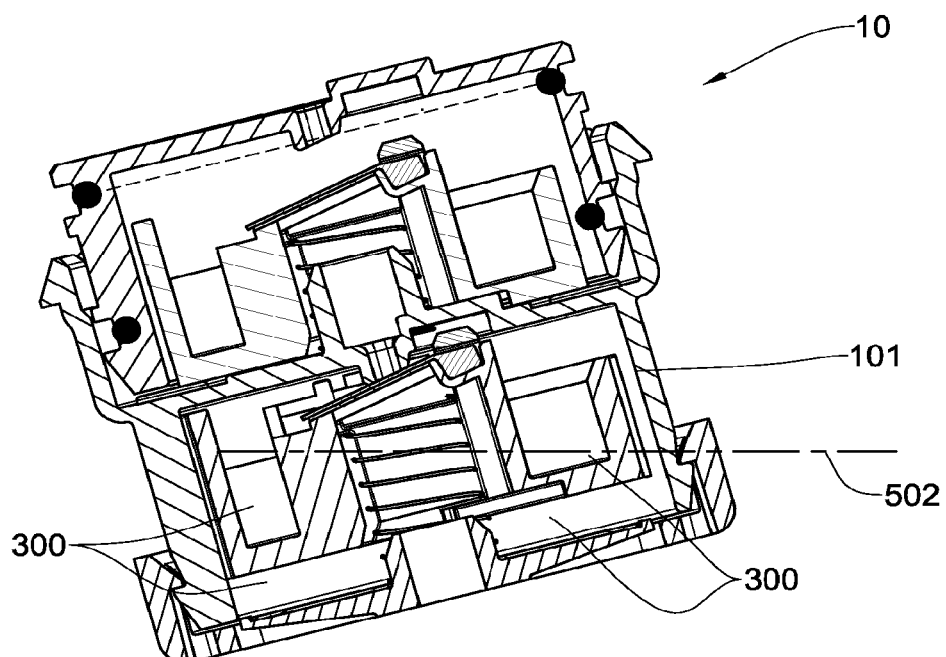
FIG. 6 is a longitudinal sectional view of the valve of FIG. 3, the valve shown inclined at an angle (i.e. tilted)

Furthermore, noting that the float members have a liquid collecting chamber with a top opening. This results in that at the event of inclination of the vehicle and the associated fuel tank, e.g. at significant steep inclination (ascending/descending), or at a roll-over or near to roll-over situation, some of the liquid spills out from the chambers 101 and 201, whereby the resultant force acting on the float member is favorable in direction of urging the float members into their sealing positions under biasing effect of the spring, and further owing to the force vector now acting in the opposite direction (cosine of the angle α of inclination; FIG. 6).

Figure 7:
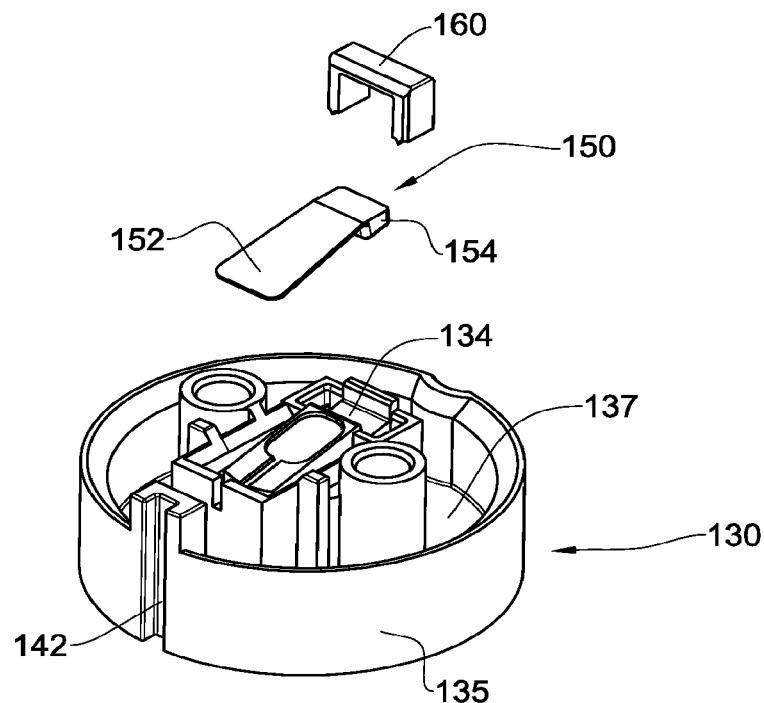
FIG. 7 is a perspective exploded view of interior parts of the roll-over valve showing a float member, flexible membrane and membrane.
Figure 8:
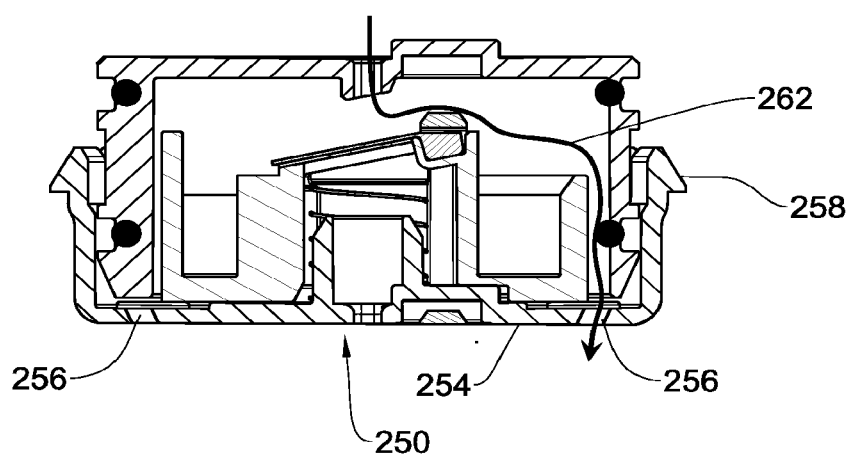
FIG. 8 is a longitudinal sectional view of a single stage float-sealable fluid path module, the valve shown in an open position.

As can be best seen in FIGS. 7 and 8 float member 130 further comprises a groove 142 formed within vertically projecting wall 132, and notch 145 of generally rectangular shape within the bottom surface of base 135. The groove 142 mates with rib element 38 formed on the inner wall of central housing 12 thus restricting motion of the float member 130 only in a longitudinal (axial) direction i.e. restricted to up-down displacement while preventing any rotational displacement of the float member about its longitudinal axis.

Membrane 150 comprises a flat membrane portion 152 and is anchored at one extremity via an anchoring stud 154 to upper wall 138 of the float member 130, and is secured by the membrane holder residing above the stud 154 and residing above the top edge vertically projecting wall 132.

Similarly within the upper float-sealable fluid path module 201 comprises identical parts to those described within lower float-sealable fluid path module 101, and designated with numeral in the 200's corresponding to like features of the parts labeled in the 100's described within chamber 101. Upper chamber 201 and lower chamber 101 are selectively in flow communication with each other via flow path 80 and orifice 35 as will be discussed hereinafter.

Operation and functioning of the valve and the associated float-sealable fluid path module 10 will now be discussed with further reference being made to the remaining figures.

At an initial state, as seen in FIGS. 2 and 3, before any liquid fuel 300 is introduced into the fuel tank, or when the fuel level is low and at regular pressure conditions and with the vehicle being level, both the lower float member 130 and the upper float member 230 reside in the fully closed position i.e. at their bottom position with the weight of the float members 130 and 230 being greater than the opposed biasing spring force from spring coils 170 and 270 respectively.

Figure 4:
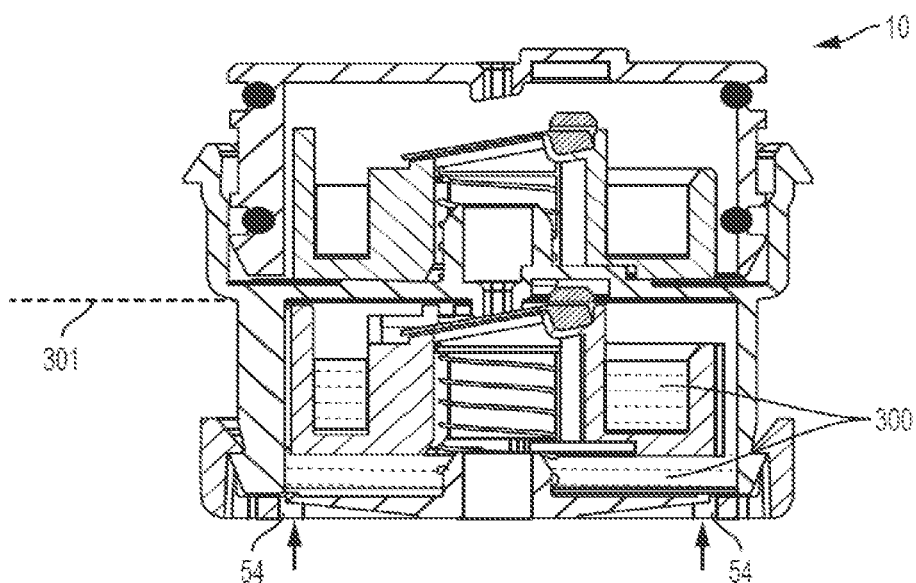
FIG. 4 is a longitudinal sectional view of the valve of FIG. 2, the valve shown in a partially closed position.

When fuel 300 is introduced into the fuel tank (not shown) in which the fuel valve resides, it fills the fuel tank to the fuel limit line which corresponds to the line 301 seen in FIG. 4. The liquid 300 is free to enter through apertures 54 and fill lower chamber 101 of the lower float-sealable fluid path module. As the chamber 101 fills, the buoyancy of the float member 130 relative to the liquid 300 causes the float member 130 to axially displace in the vertical direction until membrane 150 sealingly engages inclined bottom seating surface 84 restricting any additional displacement and bringing the lower float member 130 into a closed position. In reaching the fuel fill line 301, fuel liquid 300 also fills the collecting chamber 137. The force of spring coil 170 along with the buoyancy force is thus preset to counter the weight of the filled lower float member 130 residing within a fluid filled lower chamber 101.

Any leakage that occurs through orifice 35 while lower float member 130 resides is in a closed position will cause collection of fuel liquid 300 in upper chamber 201. As liquid level of chamber 201 of the upper float-sealable fluid path module, the buoyancy force acting on upper float member 230 will axially displace the float member 230 vertically to a closed position wherein membrane 250 sealingly engages inclined bottom sealing surface 29 thus providing a second level of sealing against leakage for the high performance roll-over valve.

In a condition of a vehicle roll-over both upper float member 230 and lower float member 130 reach their respective closed positions as shown in FIGS. 2 and 3, wherein the float members 130 and 230 are in a closed position due to gravitational forces and the biasing springs 170 and 270, both acting now in direction same as gravitational forces, to thereby displace the float members 120 and 230 into their respective sealed positions (though upside down), thus preventing fuel liquid from escaping the fuel tank towards the liquid trap.

Figure 5:
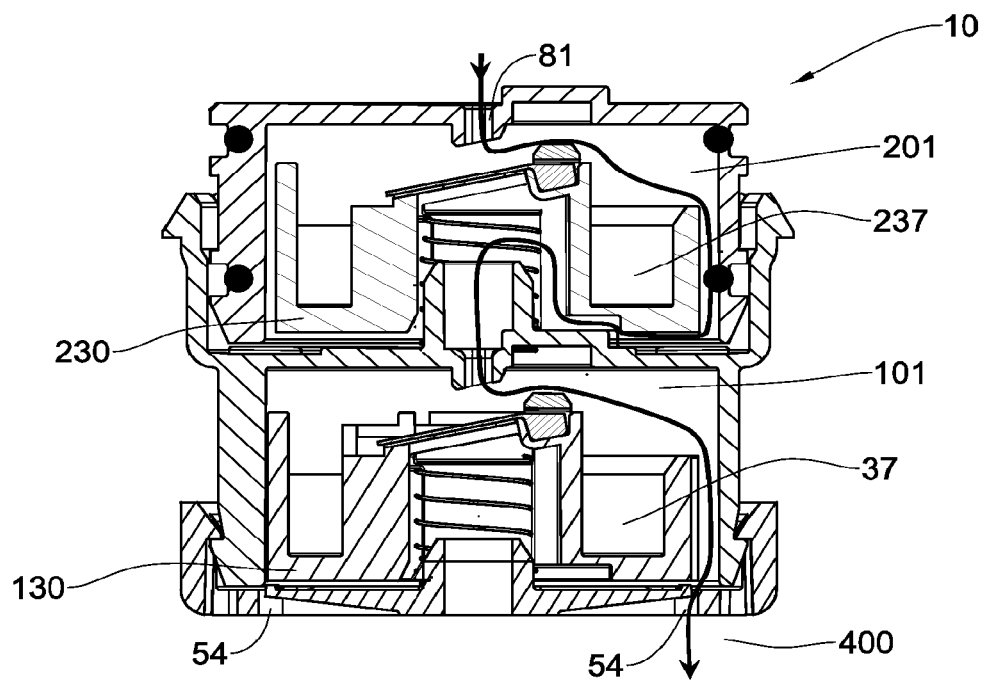
FIG. 5 is a longitudinal sectional view of the valve of FIG. 2, the valve shown in an open position.

FIG. 5 shows a condition of the float-sealable fluid path module 10 of the roll-over valve wherein upper float member 230 and lower float member 130 are in an open position. In this condition, liquid from a liquid trap (not shown) is free to flow back into the fuel tank along flow path marked by arrowed line 400. The liquid flows by gravity and enters the valve via orifice 81 collecting in upper collecting chamber 237 and upper chamber 201. As the chamber 201 fills and the buoyancy force lifts the upper float member 230, the fluid drains via flow path 80 and orifice 82 collecting within the lower float member 130 in collecting chamber 137 and lower chamber 130 and finally flowing through apertures 54 and into the fuel tank below.

FIG. 8 illustrates a single stage float-sealable fluid path module generally designated 250 and being substantially similar to that disclosed in connection with the upper module disclosed in the two-stage float-sealable fluid path module disclosed in connection with FIGS. 1 to 7, however with the exception that the base member 254 is configured with apertures 256 to facilitate liquid fuel inlet into the float accommodating housing 258, whereby the flow path is indicated by arrowed line 262. Operation of the single stage float-sealable fluid path module is as disclosed herein above in connection with FIGS. 1 to 7.

Figure 9A:
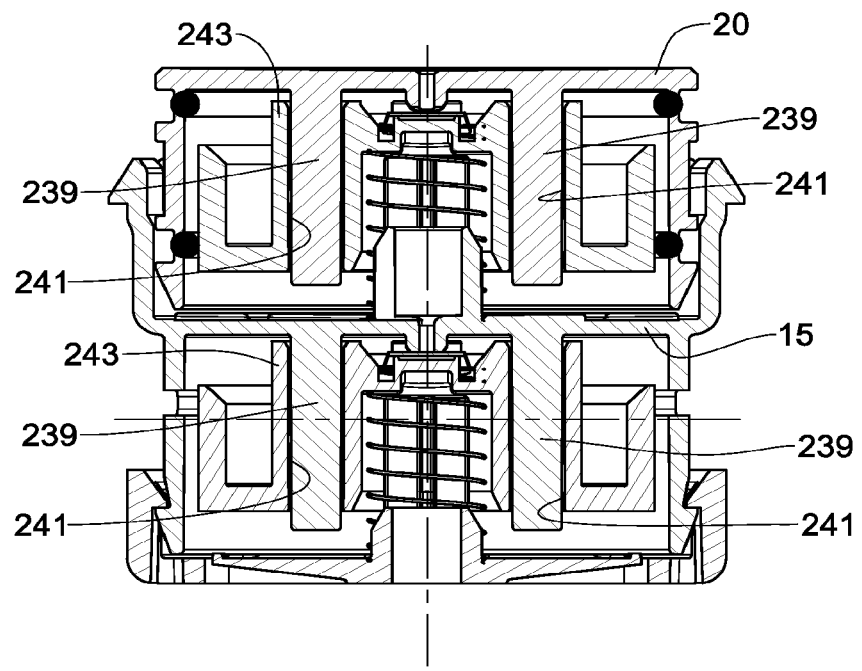
FIG. 9A is a longitudinal sectional view of a valve according to a modification of the disclosed subject matter.
Figure 9B:
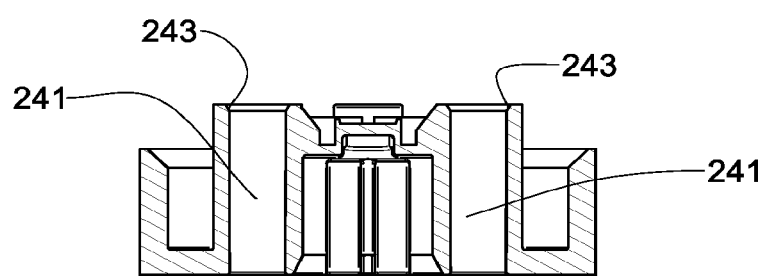
FIG. 9B is a longitudinal sectional view of a float member used in the configuration of FIG. 9A.

As can be seen in FIGS. 7 and 9A and 9B, each of the float members is movable substantially only in an axial direction, i.e. substantially free of clamping arresting during tilting and displacement thereof, that owing to leading cylindrical studs 239 downwardly extending from the central partition 15 and the upper housing wall 20, and slidingly displaceable within a pair of corresponding receptacles 241 formed in each of the float members 130 and 230. It is noted that the receptacles 241 are configured with a tapering (widened) opening 243, facilitating easy positioning of the cylindrical studs 239 into the receptacles 241.

Those skilled in the art to which this disclosed subject matter pertains will readily appreciate that numerous changes, variations, and modifications can be made without departing from the scope of the invention, mutatis mutandis.

The invention claimed is:

1. A roll-over fuel valve, comprising at least two in-line float-sealable fluid path modules, each said float-sealable fluid path module comprising a respective float member, a respective float housing and a respective biasing spring, the respective float member being axially displaceable within the respective float housing between a respective open position and a respective closed position, wherein in the respective open position fluid can flow by gravity into the respective float housing via a respective upper orifice on a top wall thereof and out of the respective float housing through a bottom aperture at a bottom cover thereof, and wherein the respective float is biased towards the respective closed position by a spring force provided by the respective biasing spring together with a buoyancy force acting on the respective float member in operation of the roll-over fuel valve, and wherein the respective float member comprises an open liquid chamber facing the respective upper orifice and configured for collecting liquid therein, such that the spring force and the buoyancy force are in a direction opposed to that of the weight of respective liquid chamber and the weight of liquid collected therein.

2. The roll-over fuel valve according to claim 1, wherein the float members extend in series, above one another, wherein fluid flow from a first said float-sealable fluid path module flows into a second said float-sealable fluid path module extending there-above.

3. The roll-over fuel valve according to claim 1, wherein the respective float members of said float-sealable fluid path modules are displaceable independently from one another, and each said respective float member is displaceable between at least a fully open position, where both said float-sealable fluid path modules are at their respective open position, facilitating airing a fuel tank and draining an associated liquid fuel trap, and a closed position wherein at least one said float-sealable fluid path module is at the respective closed position, preventing fluid flow towards the liquid fuel trap.

4. The roll-over fuel valve according to claim 1, wherein the float members are displaceable within an integrated housing.

5. The roll-over fuel valve according to claim 1, wherein the respective bottom aperture of a lower said float-sealable fluid path module is in flow communication with a fuel tank, and wherein the respective upper orifice of an upper said float-sealable fluid path module is in flow communication with a liquid fuel trap.

6. The roll-over fuel valve according to claim 1, wherein each respective said liquid chamber is configured to retain at least an amount of liquid also at inclinations.

7. The roll-over fuel valve according to claim 1, wherein each said float member is displaceable within the respective float housing only in the axial direction whereby rotation between the respective float member and the respective float housing is prevented.

8. The roll-over fuel valve according to claim 1, wherein each said respective float member has a diameter greater than a height of the respective float member.

9. The roll-over fuel valve according to claim 1, wherein each said respective float member is configured for axial displacement within the respective float housing, thereby eliminating the need for clamping in the event of a respective float housing tilt.

10. The roll-over fuel valve according to claim 1, wherein at least one said liquid chamber is compartmented.

11. The roll-over fuel valve according to claim 1, wherein each said liquid chamber has an annular cross-section, or is annular segmented.

12. The roll-over fuel valve according to claim 1, wherein at least one said float member is configured with an inclined top surface bearing a sealing member configured for sealing engagement against an outlet port of the respective float-sealable fluid path module; the outlet port being inclined in correspondence with the inclined top surface of the respective float member.

13. The roll-over fuel valve according to claim 12, wherein a top edge of the respective liquid chamber extends below a lower edge of the respective sealing member of the respective float member.

14. The roll-over fuel valve according to claim 1, wherein the respective upper orifice of one said float-sealable fluid path module extends into a respective bottom aperture of a consecutive, upper said float-sealable fluid path module.

15. The roll-over fuel valve according to claim 1, wherein each said liquid chamber has an annular cross-section, or is annular segmented, and wherein the annular or annular segmented liquid chamber can be symmetric or of an asymmetric cross-section.

* * * * *